United States Patent Office 3,737,303
Patented June 5, 1973

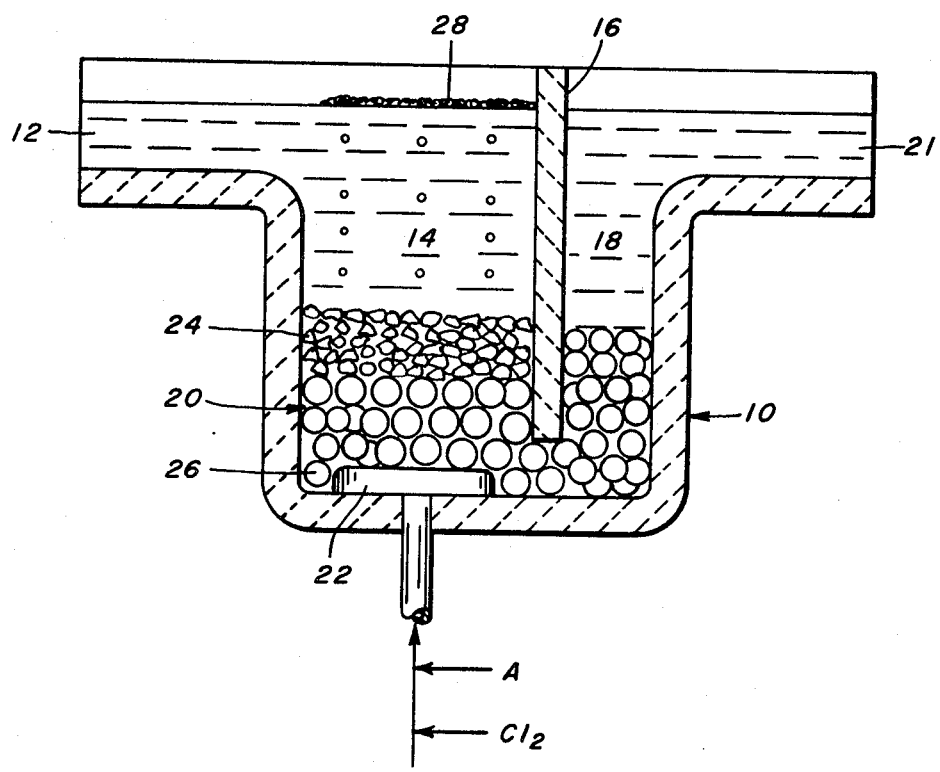

3,737,303
REFINING MOLTEN ALUMINUM WITH CHLORINE-ACTIVATED BODIES
Lee C. Blayden, New Kensington, Kenneth J. Brondyke, Oakmont, and Robert E. Spear, Murrysville, Pa., assignors to Aluminum Company of America, Pittsburgh, Pa.
Filed Dec. 2, 1970, Ser. No. 94,477
Int. Cl. C22b 21/06
U.S. Cl. 75—68 R
10 Claims

ABSTRACT OF THE DISCLOSURE

The sodium content of molten aluminum along with the oxide and hydrogen gas content, is reduced by an improved process wherein the molten aluminum is passed through a bed of refractory bodies. The refractory bodies have their surfaces activated by chlorine and are reactive to the sodium impurities. The refractory body bed is continuously flushed with a non-reactive gas flux to remove chlorine reaction products formed in the bed. The improvement is capable of chlorine fume-free operation and accordingly is especially useful where pollution control is important.

BACKGROUND

The invention relates to treatment of molten aluminum especially with respect to reducing its sodium content.

Molten aluminum is often contaminated with non-metallic particles, mainly oxides, and hydrogen gas from moisture in the atmosphere together with sodium or other metallic impurities which can be introduced in the smelting process. It is important that these impurities be reduced to the extent possible in order to achieve better fabricating economies and develop certain desirable properties in the fabricated products. Gas and oxide impurities lead to voids, and discontinuities in the metal cross section. Sodium interferes with certain fabrication procedures, especially hot rolling where significant amounts of sodium can cause severe edge cracking. This is especially critical in aluminum alloys containing magnesium, for instance ½ to 10% magnesium, where edge cracking can become very serious. It is generally considered necessary in current hot rolling lines that an aluminum-magnesium alloy should contain not more than 0.0005% sodium. There are several processes which are effective to reduce sodium levels to this amount in current use. Most of these processes employ chlorine to react with sodium to produce sodium chloride and many produce excessive chlorine fumes which can create serious pollution problems. Recent developments indicate that further sodium reductions of down to 0.0002% or less, and especially 0.0001% or less, on a commercial basis, could facilitate great gains in hot rolling where especially heavy reductions, of 20% or more, per pass could be realized along with gains of 20% or more in the continuous ingot casting rates. However, attempts to reduce the sodium to these extremely low levels often result in even more chlorine fumes and the attendant pollution problems.

U.S. Pat. 3,039,864 to Hess, Brondyke and Jarrett describes a process where argon or another non-reactive gas is passed through a bed of refractory bodies in contact with molten aluminum to remove non-metallic impurity particles such as oxides along with hydrogen gas from the molten aluminum. U.S. Pat. 3,025,155 to Lee, Brondyke and Hess describes a process where a relatively small stream of chlorine or other chlorinaceous gas is passed through a bed of refractory bodies in contact with molten aluminum also moving through the bed to reduce the content of metallic impurities such as sodium.

The present invention can be considered an improvement over either of the Hess et al. and Lee et al. processes just mentioned and enables achieving quite low sodium levels and completely fume-free chlorine utilization. In addition, gas and non-metallic impurities are reduced and the life of the refractory body bed is extended considerably.

STATEMENT OF THE INVENTION

Basically, the invention contemplates moving molten aluminum through a purification zone where it passes through a bed of refractory bodies such as alumina bodies or granules. The surfaces of the refractory bodies are chlorinate such that their surfaces become chlorine activated and capable of chlorine treating the molten aluminum passing through the refractory bed to react with sodium therein. The refractory body bed is chlorine activated by passing therethrough a stream of chlorine or other chlorinaceous gas while the bed is submerged in molten aluminum. After a period of time the chlorine gas introduction is curtailed or even terminated and the treatment of molten aluminum continues without further substantial chlorine introduction thus rendering the improved process, at this stage, capable of chlorine fume-free performance without exercising any additional controls on the use of the chlorine or other chlorinaceous gas. In order to enhance the efficiency of the chlorination of the molten aluminum in the chlorine activated refractory body bed, it is important that the bed be continuously flushed with a stream of a non-reactive gas flux such as argon. This removes chlorination reaction products such as sodium chloride which could otherwise interfere with the continued functioning of the chlorine activated refractory body bed in the treatment. As indicated in the Hess et al. patent a non-reactive gas flux can remove dissolved hydrogen gas from the molten metal along with non-metallic impurity particles such as oxides. In addition to the above-mentioned advantages, the improved practice also results in a substantial increase in refractory body bed life over previous practices.

DETAILED DESCRIPTION

In the description which follows reference is made to the figure which is an elevational section of a schematic arrangement of the type described in U.S. Pat. 3,039,864 and suitable in the practice of the present improvement.

Referring to the figure, molten aluminum enters the treatment vessel 10 through inlet 12 and passes downwardly in the down leg 14 on the inlet side of the baffle 16 which divides the vessel 10 into the down leg 14 and up leg 18. In the vessel 10 is situated a bed 20 of refractory bodies and the molten metal passes downwardly through the bodies and then upwardly through up leg 18 and exits through outlet 21. As the molten metal passes through the refractory body bed it is contacted with a stream of gas which enters the bed through disperser 22. The figure shows a counterflow relation between the molten aluminum and the gas flux which arrangement is preferred since it favors longer gas-liquid contact times. However, the advantages of the invention are also largely achieved with other arrangements such as co-current flow.

The refractory body bed 20 may include a portion 24 of refractory granules ranging in size from 3 to 14 mesh. This assures very high utilization of the non-reactive gas flux and improves the removal of gas and oxide particle impurities. This optional but preferred portion of the bed may typically be about 10 inches deep although a depth of 4 inches, and preferably at least 6 inches, to 20 inches can be employed to advantage. It can be supported upon a portion 26 of larger refractory bodies of at least ¼ inch size and preferably at least ½ inch size, ¾ to 1 inch size bodies serving this purpose quite well.

The supporting bed portion 26 can vary from about 2 to 10 inches or even more in depth. The effective depth of the bed is considered to be the submerged depth above the disperser 22, that is the bed depth where the non-reactive gas flux can contact the molten metal. The gas flux is introduced into the supporting bed portion 26 and then passes into the finer granule bed 24. As indicated in the Hess et al. and Lee et al. patents, suitable refractory bodies should be inert to the molten aluminum and include chromite, corundum, forsterite, magnesia spinel, periclase, silicon carbide and zircon, with tabular alumina (synthetic corundum) being preferred. One additional characteristic of the refractory bodies according to the present improvement is that they have chlorine retentive surfaces. That is, that they should have surfaces which can capture atoms, molecules or bodies of chlorine gas for utilization during the period when the chlorine gas flow is terminated. Most refractory materials exhibit some degree of porosity and are suitable to retain the small amounts of chlorine needed in practicing the invention. Fused refractories are less desirable than non-fused which are preferred.

Along the lines indicated in U.S. Patent 3,039,864, it may be desirable prior to initially operating the improved arrangement that the refractory bodies be preheated to a temperature of 1200 to 1600° F., preferably above 1400° F., and then added to the container which has been initially provided with molten metal sufficient to cover the refractory body bed. This is especially suited to portions of the bed containing small granular bodies, for instance 3 to 14 mesh size. In this method of preparation the fluxing gas may be introduced prior to commencement of metal flow to treat the initial body of molten metal if such is desired. Additional information concerning this method of refractory body bed preparation can be found in U.S. Pat. 2,863,558 to Brondyke and Stroup.

Operating temperature is about 1250° to 1500° F., with a range of 1300° to 1400° F. being preferred. Some sort of heating means, not shown, is employed to maintain proper temperature. Suitable means include internal immersion heaters, fired or electrical or external heaters.

As indicated earlier, the present improvement contemplates the use of both a reactive chlorinaceous gas flux and a non-reactive gas flux. The reactive chlorinaceous gases which may be employed in practicing the invention include chlorine gas and vaporous chlorides which are reactive with metals more electropositive than aluminum, that is, metals such as sodium. The chlorinaceous gas should not introduce any contaminants into the molten metal by reaction therewith or with the refractory bodies. Suitable examples are aluminum chloride and certain chlorinated hydrocarbons such as hexachloraethane, although it is much preferred to use chlorine gas since such is economical and can be handled with facilities presently available in most plants readily.

The non-reactive fluxing gas should be substantially non-reactive or inert toward molten aluminum. The inert gases of the periodic table, helium, neon, argon, krypton and xenon and mixtures thereof are suitable although nitrogen and, to a less desired extent, carbon dioxide may also be employed although, in the latter two instances, precautions are warranted to avoid the formation of nitrides, oxides, carbides and complexes thereof. Argon serves the purpose quite well and is considered preferred as a non-reactive fluxing gas because of its effectiveness and availability.

In operation the invention contemplates that the chlorinaceous gas introduction be intermittent in that it is applied for a period of time sufficient to chlorine activate the surfaces of the refractory bodies in the bed. At this point it is interrupted or substantially curtailed. For instance it can be reduced to a level providing less than the stoichiometric equivalent of the sodium in the molten aluminum passing through the refractory body bed such that it is of little if any significance in directly removing sodium but will permit substantially chlorine-free operation once the bed is chlorine activated. Throughout the entire process of molten aluminum treatment a non-reactive gas flux is passed through the refractory body bed. During periods of interrupted chlorinaceous gas flow such gas flux may have no chlorine content or may be only substantially chlorine-free either condition facilitating avoidance of chlorine fumes.

Chlorine activation of the refractory body bed is effected while the bed is submerged in molten aluminum which enables the bed to capture chlorine, and usually requires some period of time, typically up to 6 hours. Chlorination can be effected under conditions of no metal movement through the bed although continuous metal flow may be preferred in some instances and the invention, as explained hereinafter, contemplates uninterrupted metal flow with continuous treatment thereof. The rate of chlorinaceous gas application during the refractory bed chlorine activation period preferably provides from 0.00025 to 0.02 standard cubic feet per hour (s.c.f.h.) of chlorine per square inch of bed cross sectional area measured in a plane normal to the direction of the gas flow, a horizontal plane in the embodiment shown in the figure. A typical level is 0.01 s.c.f.h. per square inch of bed section for a bed about 20 inches deep. The chlorinaceous gas flow rate can also be expressed as a function of metal in the bed under static flow conditions or moving through the bed under metal flow conditions and a rate of 0.004 to 4 s.c.f. per thousand pounds of molten aluminum is preferred. These preferred rates accomplish chlorine activation of the bed with little or no chlorine fume emission. For instance at a chlorine rate of 1 s.c.f. per thousand pounds of aluminum there is substantially no chlorine fume above the molten metal in that measurement conducted with a Mine Safety Appliance Company chlorine detector tube using a universal sampling pump, indicated zero parts per million chlorine. This practice is considered preferred where pollution control is considered paramount in importance. On the other hand, considerably higher chlorinaceous gas rates may be employed during the chlorine activation period and such will tend to accelerate the rate of chlorination and activation of the refractory body surfaces in the bed. The penalty here is some amount of chlorine evolution from the molten metal, although for relatively short periods of time, typically ½ hour to 1 hour. Chlorine rates of up to 30 s.c.f. per thousand pounds of molten metal in or passing through the bed or 0.15 s.c.f.h. per square inch of bed section effectively chlorine activate the bed in periods of as little as ½ hour. During this period the chlorine fume emission can be passed through a scrubber or other suitable arrangement for chlorine removal. Once the bed is chlorine activated it is effective in treating the molten aluminum for extended periods of up to 10 hours and substantially longer without the need of further chlorinaceous gas. During the periods when the refractory body bed is being chlorine activated it is preferred that non-reactive gas flux flow be maintained. The respective gas fluxes can be introduced separately as by a separate disperser for each gas, although it is preferred that the gases be mixed to provide a substantially homogeneous mixture which is introduced through a common dispersing system as shown in the figure. Premixing can be effected by combining the gas streams in a common conduit and facilitates a highly uniform distribution through the bed of each fluxing gas through the bed. The gas mixture should be introduced by spreading the gases substantially uniformly across substantially the entire cross section, or at least a substantial portion, of the fluxing region of the refractory body bed, the fluxing region being in down leg 14 in the embodiment shown in the figure.

The exact nature of the chlorine activation of the refractory body bed is not fully understood. Sorptive effects may be involved whereby chlorine is sorbed (adsorbed, absorbed, chemasorbed, etc.) into or onto the immersed refractory body surfaces to chlorine activate the bed, although some types of refractory bodies not usually considered especially porous are quite suitable in practicing the improvement. For instance, tabular alumina which is not considered a very porous type of alumina (1.5% water adsorption) is preferred for the refractory bodies. In any event the bed retains a level of chlorine activation such as to be effective in reacting with elements such as sodium for prolonged periods of no chlorine gas introduction even though the bed is continuously flushed with substantial amounts of argon to remove the products of chlorine reaction with the molten aluminum.

A convenient way of measuring the chlorine activity level of the refractory body bed in terms of effectiveness contemplates that the bed be activated by passing therethrough a small stream of chlorine and measuring the sodium level of the exiting molten aluminum to determine the level of sodium removal achieved in the bed. Once the desired level is reached, chlorine introduction can be curtailed or interrupted. The chlorine activated bed will continue to maintain the low sodium level for extended periods of time, ten hours or more being typical. After some period of time, for instance 15 hours or so, the sodium level is observed to increase which is considered an indication that the chlorine activation of the bed has decreased below the desired level, that is the level which effects the desired sodium reduction. The chlorine activation level of the bed can be restored or regenerated by resuming the introduction of chlorine as before. To be safe and positively assure no interruption in the desired sodium level, the chlorine regeneration could have commenced after a period of time shorter than the illustrative 15 hour period and predetermined to assure a constant desired low sodium level. For instance chlorine activation regeneration of the bed might have commenced after 12 hours and continued for about 2 or 3 hours and the chlorine flow again terminated for another 12 hours. It can be seen that the present improvement contemplates such predeterminations to provide substantially continuous runs of uninterrupted predetermined low sodium levels in the molten metal treated.
the molten metal treated.

To illustrate the rate in which effective chlorination can occur during treatment, molten aluminum containing 0.0005% sodium was passed through an arrangement of the type shown in the figure and including a 10 inch deep bed of 3 to 14 mesh tabular alumina. The molten metal flow rate was 5000 pounds per hour which translates to about 20 pounds per hour per square inch of refractory body bed area in a horizontal section, that is a section normal to the downward mean flow path of the molten aluminum. Through the disperser 22 there was introduced a mixed gas stream of argon and chlorine gas fluxes, the respective rates being 25 s.c.f.h. and 1 s.c.f.h. The sodium content in the stream 21 exiting the unit was measured periodically and the results are shown in the table below.

| Hours: | Na content, percent |
| --- | --- |
| Initial | 0.0005 |
| ½ | 0.0003 |
| 2 | 0.0002 |
| 4 | 0.0001+ |
| 6 | 0.0001− |

The chlorine flow was terminated and the run continued for 8 hours during which the 0.0001% sodium level was maintained in the outlet stream. During the entire period of the run the argon flow was maintained at the substantially constant rate of 25 s.c.f.h. During the chlorine gas application to activate the bed, the flow rate, 1 s.c.f.h., was so small that there was no chlorine gas emission above the surface of the melt in that gas measurements indicated zero part per million chlorine gas immediately above the melt surface, thus demonstrating that the improved process can readily perform on a completely chlorine fume-free basis, both during and after bed activation.

The amount of the non-reactive fluxing gas employed to continuously flush the chlorine activated refractory body bed varies from about 0.005 to 0.5 s.c.f.h. per square inch of refractory body bed cross sectional area measured in a plane normal to the gas travel, that is the horizontal plane in the figure since such is normal to the upward gas flow. The invention contemplates molten metal flow rates of 5 to 75 pounds per hour per square inch of refractory body bed cross sectional area measured in a plane normal to the metal travel, a horizontal plane in the embodiment shown in the figure. Another way of expressing non-reactive gas flux flow rate is as related to metal flow, the gas flow amounting to from less than 1 to about 100 standard cubic feet per thousand pounds of metal. The herein designated amounts of non-reactive gas flux flow assures a continuously adequate flushing of the chlorine activated refractory body bed so as to continuously remove products resulting from the chlorine reaction with sodium or other metallic impurities in the molten aluminum. The specified non-reactive gas flow rates are also effective in reducing the gas content of the molten aluminum to levels of 0.15 ml. and less of gas per 100 grams of molten aluminum. The presence in the refractory bed of chlorine activated surfaces on the refractory bodies also tends to de-wet non-metallic or oxide impurity particles such as oxides such that they too can be flushed from the refractory body bed. The chlorine reaction products and non-metallic particles rise from the bed to form a skim 28 on the surface of the molten aluminum which can be conveniently removed periodically. The skim is of the so-called "dry" type containing substantially no molten aluminum but does contain mostly dry oxide and sodium chloride salt, a dry solid. There is no evidence of any liquid salt either in the skim or in the refractory body bed.

In addition to the advantages discussed above the invention substantially extends the useful life of the refractory body bed over the life expected with previous arrangements, for instance improvements of 25% or more over the life where substantially pure argon is passed through a bed which has not been chlorine activated. It is believed that this benefit is related to the de-wetting action which the chlorine activated bed imparts to the non-metallic particles and the continuous flushing thereof from the bed.

The improvement has been described with particular reference to removing sodium which can be an especially troublesome impurity. However, the improvement is also useful to remove potassium, lithium, calcium and other impurity elements more electropositive than aluminum.

While the invention has been described in terms of preferred embodiments, the claims appended hereto are intended to encompass all embodiments which fall within the spirit of the invention.

What is claimed is:
1. The method of treating molten aluminum comprising
   (1) passing a stream of a reactive chlorinaceous gas flux through a bed of refractory particles submerged in molten aluminum to chlorine activate the surfaces of said refractory bodies,
   (2) interrupting the flow of said chlorinaceous gas,
   (3) continuously passing molten aluminum through said chlorine activated refractory body bed to chloridize impurities in said molten aluminum; while
   (4) continuously flushing said bed by passing therethrough a non-reactive gas flux to remove gas from said aluminum and to remove from said bed products resulting from chloridization of metallic impurities and chlorine de-wetted oxide particles.
2. The method of treating molten aluminum comprising
   (1) passing a stream of a reactive chlorinaceous gas flux through a bed of refractory particles submerged in molten aluminum to chlorine activate the surfaces of said refractory bodies,
   (2) interrupting the flow of said chlorinaceous gas,
   (3) continuously passing molten aluminum through said chlorine activated refractory body bed to chloridize impurities in said molten aluminum, while
   (4) continuously flushing said bed by passing there- through a non-reactive gas flux to remove gas from said aluminum and to remove from said bed products resulting from chloridization of metallic impurities and chlorine de-wetted oxide particles, and (5) periodically regenerating the chlorine activation of said refractory body surfaces by resuming the flow of said reactive chlorinaceous gas through said bed.

3. The method of treating molten aluminum containing sodium as an impurity comprising (1) passing a stream of a reactive chlorinaceous gas and an unreactive gas flux through a bed of refractory particles submerged in molten aluminum to chlorine activate the surfaces of said refractory bodies, (2) interrupting the flow of said chlorinaceous gas, (3) continuously passing molten aluminum through said chlorine activated refractory body bed to chloridize impurities in said molten aluminum, while (4) continuously flushing said bed by passing therethrough a non-reactive substantially chlorine-free gas flux to remove gas from said aluminum and to remove from said bed products resulting from chloridization of metallic impurities and chlorine de-wetted oxide particles, and (5) periodically regenerating the chlorine activation of said refractory body surfaces by resuming the flow of said chlorinaceous gas through said bed, said regeneration being effected after a predetermined time of chlorine gas free operation, the time being selected with respect to the sodium content of the treated aluminum to assure substantially uninterrupted molten aluminum treatment.

4. The method of treating molten aluminum comprising (1) passing the molten aluminum continuously through a bed of refractory bodies submerged therein and having chlorine activated surfaces as the result of passing a reactive chlorinaceous gas flux through said bed, said chlorinaceous gas flow having been interrupted, thereby to chloridize impurities in said molten aluminum, and (2) continuously flushing said bed with a non-reactive gas flux.

5. The method according to claim 1 wherein the refractory bodies are tabular alumina.

6. The method according to claim 1 wherein the non-reactive gas is substantially argon.

7. The method according to claim 1 wherein the non-reactive gas flux is a substantially chlorine-free gas.

8. The method according to claim 1 wherein the chlorinaceous gas is chlorine.

9. The method according to claim 1 wherein the refractory body bed is tabular alumina and at least a portion thereof ranges in size from 3 to 14 mesh.

10. The method according to claim 1 wherein the molten metal treated contains sodium content which sodium is reduced by said treatment.

References Cited

UNITED STATES PATENTS

| | | | |
|---|---|---|---|
| 3,025,155 | 3/1962 | Lee et al. | 75—68 R |
| 3,087,808 | 4/1963 | Gottschalk | 75—68 R |
| 3,039,864 | 6/1962 | Hess et al. | 75—68 R |
| 3,149,960 | 9/1964 | Robinson | 75—68 R |
| 2,094,028 | 9/1937 | Stroup | 75—68 R |
| 3,025,154 | 3/1962 | Kurfman | 75—68 R |
| 3,172,757 | 3/1965 | Hess et al. | 75—68 R X |
| 3,281,238 | 10/1966 | Bachowski et al. | 75—68 R X |
| 3,305,351 | 2/1967 | Bylund | 75—68 R |
| 3,537,987 | 11/1970 | Copeland | 75—68 R X |
| 3,230,073 | 1/1966 | Ericsson | 75—10 |
| 3,547,622 | 12/1970 | Hutchinson | 75—10 |

FOREIGN PATENTS

| | | | |
|---|---|---|---|
| 1,148,344 | 4/1969 | Great Britain | 75—68 R |
| 733,830 | 5/1969 | Belgium | 75—68 |
| 1,266,500 | 3/1972 | Great Britain | 75—68 |
| 111,305 | 1939 | Australia | 75—10 |

L. DEWAYNE RUTLEDGE, Primary Examiner

M. J. ANDREWS, Assistant Examiner

U.S. Cl. X.R.

210—69